(12) United States Patent
Kohlen et al.

(10) Patent No.: US 6,290,775 B1
(45) Date of Patent: Sep. 18, 2001

(54) FLUIDIZED BED REACTOR AND A PROCESS OF USING THE SAME

(75) Inventors: Rainer Kohlen, Wehrheim; Lothar Kaiser, Heusenstamm; Alexander Ruhs, Rheinfelden; Birgit Bertsch-Frank, Gründau, all of (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/257,253

(22) Filed: Feb. 25, 1999

(30) Foreign Application Priority Data

Feb. 27, 1998 (DE) ............................................ 198 08 439

(51) Int. Cl.$^7$ ........................................................ B05C 5/00
(52) U.S. Cl. .................... 118/303; 118/DIG. 5; 427/182
(58) Field of Search ...................................... 118/303, 304, 118/DIG. 5; 23/313; 423/239; 427/180, 203, 182

(56) References Cited

U.S. PATENT DOCUMENTS 5,211,985 * 5/1993 Shirley, Jr. et al. ................. 427/213

FOREIGN PATENT DOCUMENTS

| 0 332 929 B1 | 9/1989 | (EP) . |
| 38 08 277 A1 | 9/1989 | (DE) . |
| 1508777 * | 4/1978 | (GB) . |
| 93/06941 | 4/1993 | (WO) . |

OTHER PUBLICATIONS

Franz Schaub, Chem.–Ing.–Technik, 24.Jahrg. 1952/Nr.Z, pp. 98–103.
Uhlemann, Chem.–Ing.Technik, 62(1990), pp. 822–834.

\* cited by examiner

*Primary Examiner*—Richard Crispino
*Assistant Examiner*—Yewebdar Tadesse
(74) *Attorney, Agent, or Firm*—Wenderoth, Lind & Ponack, L.L.P.

(57) ABSTRACT

The invention relates to a fluidized bed reactor for the continuous production of fluidized bed granules. The reactor is characterized by a discharge device designed as a siphon pipe or siphon weir. The fluidized bed reactor permits a trouble-free continuous operation of the fluidized bed stage and of a connected, continuous subsequent stage. A preferred fluidized bed reactor comprises two chambers that are in communication via the discharge device according to the invention.

5 Claims, 3 Drawing Sheets

FLUIDIZED BED REACTOR AND A PROCESS OF USING THE SAME

SUMMARY OF THE INVENTION

The present invention relates to a fluidized bed reactor with a granule discharge device according to the invention and its use for the continuous production of granules. The discharge device enables a smooth, trouble-free conveyance of the granules to a following continuous process stage, in particular to a process stage carried out in a fluidized bed.

BACKGROUND OF THE INVENTION

The continuous production of granules as well as coated granules by spraying liquid starting materials onto or into the fluidized bed of a one-stage or multi-stage fluidized bed reactor is becoming increasingly technically important. An overview of the technology of fluidized bed spray granulation that is suitable for both the production and coating of granules, is provided by H. Uhlemann in Chem. Ing. Tech, 62 (1990), pp. 822–834. Fluidized bed reactors generally comprise a vessel with a fluidizing base plate arranged horizontally or inclined therein, the region above the fluidizing base plate being termed the fluidized bed chamber and the region underneath the floor being termed the blast box, devices for introducing a fluidizing gas, which may at the same time serve as a drying and/or reaction gas, and for removing the gas leaving the fluidized bed, devices for introducing solid starting substances such as nuclei or particles to be coated, and/or introducing liquid starting materials such as solutions and melts, as well as one or more devices for discharging the granules formed in the fluidized bed.

The discharge devices may comprise those with or without a screening action. Devices with a screening-type granule discharge generally include screening pipes whose upper end is situated in the plane of the fluidizing base plate and through which flows a screening gas in the direction opposite to the granule discharge. A non-screening discharge may also be arranged as an outlet in the side wall of the fluidized bed chamber, the lower edge of the outlet opening being at the level of the fluidized bed floor. According to EP Patent 0 332 929 a zigzag screening device is joined to the fluidizing base plate of a fluidized bed granulator for the fluidized bed spray granulation and a feedback shaft is mounted at the connection site. In order to avoid blockage the granules are fed from the fluidized bed chamber through an underflow weir to the screening device.

In the continuous production of granules by fluidized bed spray granulation and coating of these granules by spraying the latter with a liquid coating material in a following second fluidized bed reactor, the granules from the first fluidized bed reactor were discharged downwards through the floor via screening pipes and were then passed by means of blow-through chamber wheel locks and pneumatic conveying lines to the second fluidized bed reactor serving as the coating reactor. It was found that the operating costs and the susceptibility to breakdown of this procedure are high. In order to reduce expenditure on apparatus and power and labor costs, attempts have been made to carry out both stages in a continuous operation by using a tray-shaped fluidized bed reactor comprising two zones. Conventional weirs with and without underflow openings were tested as a device for separating the two zones. In all cases unallowable back-mixing occurred. A further problem was that the filling height, which is very important as regards product quality and operational reliability, cannot be maintained constant. Fluctuating fluidized bed heights also had a deleterious effect on the service life of the spray nozzles.

SUMMARY OF THE INVENTION

The object of the invention is accordingly to provide a fluidized bed reactor in which individual and preferably all the aforementioned problems can be avoided or at least reduced. According to a further object the fluidized bed reactor should be designed so that the continuously discharged granules can be fed as starting material directly to a following, continuously operating process stage, in particular to a process stage carried out in a fluidized bed, and in such a way that no back-mixing occurs between the two stages. According to yet a further object the fluidized bed reactor should be designed so that the bed height can reliably be maintained constant.

A fluidized bed reactor has now been developed for the continuous production of granules, comprising a fluidized bed chamber (K1) whose floor is designed as a fluidizing base plate (1), devices for introducing and discharging a fluidizing gas (11.1 and 15.1), devices for introducing liquid starting products or starting products dissolved and/or suspended in a liquid, for the granules (8.1 and 9.1), and at least one device for discharging the granules, which is characterized in that the discharge device is formed as a siphon pipe or as a shaft-shaped siphon weir comprising a shaft wall (3) and a chamber wall (2), the lower edge of the shaft wall of the discharge device being arranged at a height $h_1$ and the lower edge (6) of the outlet opening (5) of the discharge device being arranged at a height $h_2$, in each case measured from the fluidizing base plate, $h_2$ being greater than $h_1$ and $h_2$ having a value that ensures an overflow of granules in the operating state.

The dependent claims cover preferred embodiments of the reactor and reactor combinations comprising this reactor. The essential feature according to the invention is the discharge device formed as a siphon pipe or siphon weir. The fluidized bed reactor may include one or more discharge devices according to the invention.

DETAILED DESCRIPTION OF THE INVENTION

Figure 2:
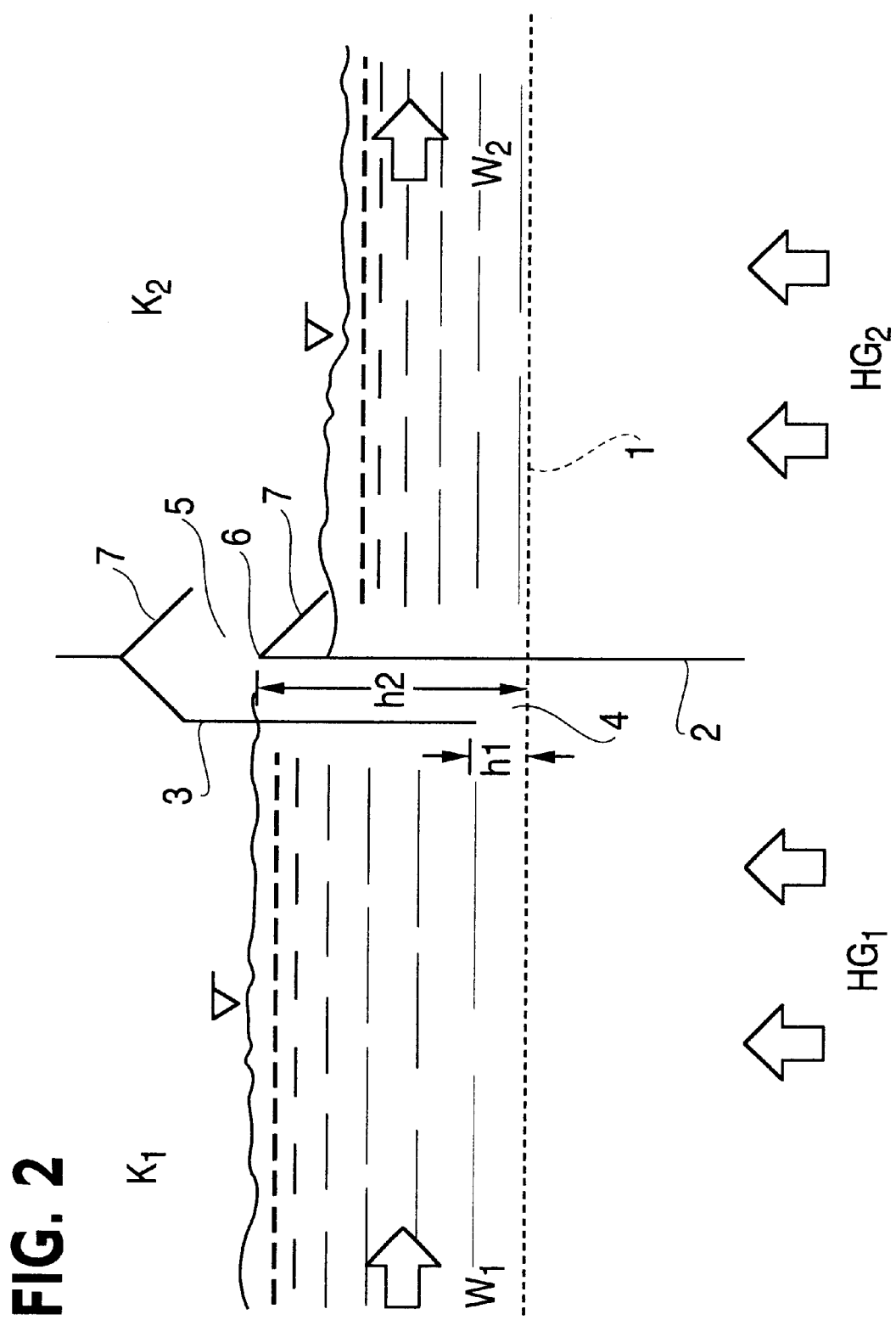
FIG. 2 shows diagrammatically a siphon weir serving as a separating unit between two independent fluidized bed chambers.

The functioning of the discharge device in the form of the preferred shaft-shaped siphon weir is illustrated with the aid of FIG. 2. Two chambers $K_1$ and $K_2$ of a fluidized bed reactor with the fluidizing base plate 1 are separated from one another by a chamber wall 2 forming part of the siphon weir. The shaft wall of the weir arranged in the chamber $K_1$ is situated at an effective distance from the chamber wall and forms a shaft with the latter. The shaft situated in the chamber $K_1$ is closed at the top, but is open in the conveying direction and is thus open to chamber $K_2$, and serves as an outlet opening 5 (=overflow opening). The lower edge 6 of the outlet opening is arranged at a height $h_2$ above the fluidizing base plate. The sides of the shaft are closed, in other words the shaft is formed as a box. The lower edge of the weir terminates at a height $h_1$ above the fluidizing base plate. Guard roof 7 is preferably provided above and below the overflow opening 5 arranged in the chamber wall, so as to prevent any accidental reverse flow into the chamber $K_1$ of product fluidized in the chamber $K_2$. The inlet opening 4 of the shaft is arranged between the fluidizing base plate and the lower edge of the shaft wall 3. The shaft floor is basically designed as a fluidizing base plate so that the fluidizing gas can also enter the shaft. The fluidized beds arranged directly after one another in the chambers $K_1$ and $K_2$ are identified by $W_1$ and $W_2$. The horizontal arrows indicate the flow direction of the fluidized beds, and the vertical arrows under the fluidizing base plate indicate the direction of the fluidizing gas. The siphon weir enables the granules to be conveyed from the chamber $K_1$ to the chamber $K_2$ through the shaft formed between the shaft wall 3 and separating wall 2, if the height of the fluidized bed in $K_1$ rises above a certain level, in general above the height $h_2$. Operation of the granulation chamber $K_1$ when empty and overloading or other operational malfunction in the chamber $K_2$ are prevented by the siphon weir. The filling level in the chamber $K_1$ can be maintained reliably and independently of the filling level in the chamber $K_2$. Although a pressure difference between both chambers influences the filling level in $K_1$, this influence can however be calculated and controlled. The conveying action in the shaft is assisted by the fact that, in contrast to the conventional design of the actual fluidized bed chamber, the shaft does not have any extended expansion space. The weir also prevents a back mixing; the effect is further enhanced by the guard roofs. The distance of the lower edge of the shaft wall 3 from the fluidizing base plate 1 is decisive as regards the grading effect between $K_1$ and $K_2$.

Figure 3:
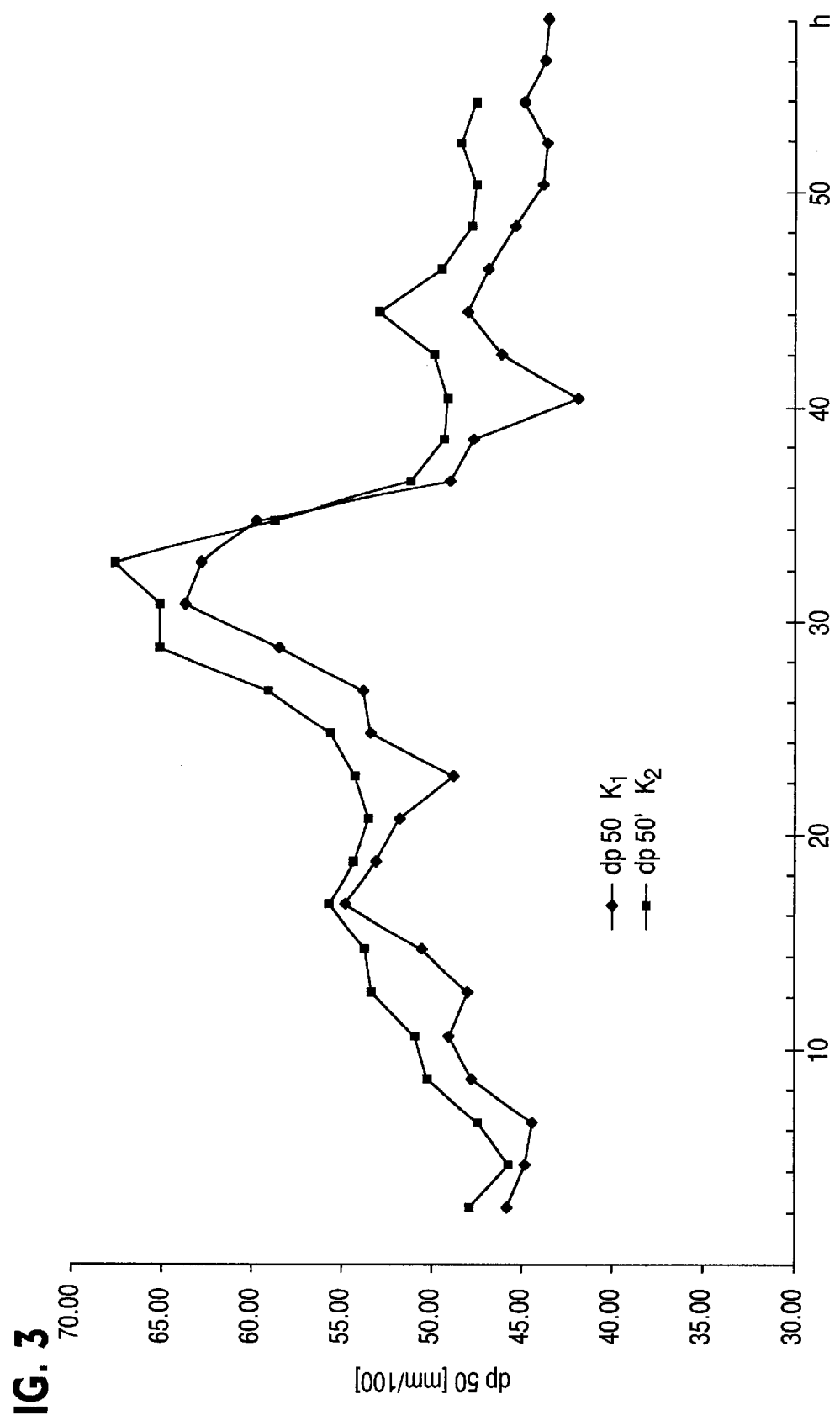
FIG. 3 shows dp-50 values of samples from both chambers, the time values of the product from the second chamber being corrected by the mean residence time of the product in this chamber for purposes of comparability.

The observed grading effect produced by the siphon weir is attributed to the fact that, in a conventional fluidized bed apparatus with a conically extended expansion space, the probability of coarser particles remaining directly above the fluidizing base plate, i.e. in the region of the inlet opening of is the siphon weir, is relatively high. FIG. 3 shows the effect obtained in an arrangement for producing coated granules by composite granulation in the chamber $K_1$ and coating in the chamber $K_2$. Although the $dp_{50}$-value increases by about 2% (assuming a homogeneous distribution on the particle surface) as a result of the coatings, and removal of dust also occurs in the chamber 2, a certain grading effect is still produced by the siphon weir. The two curves in FIG. 3 have been shifted by the mean residence time for purposes of comparability.

Figure 1:
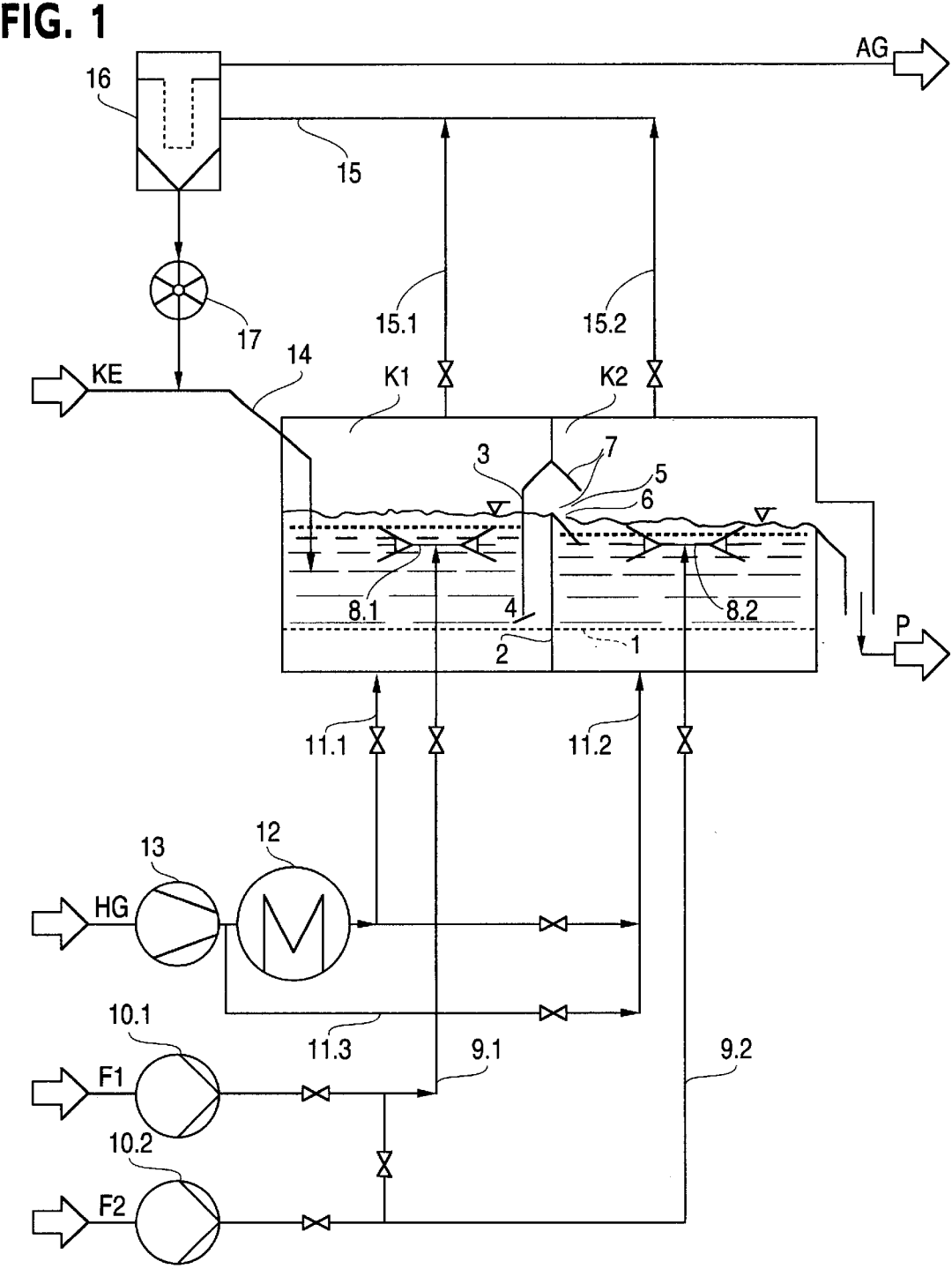
FIG. 1 shows in diagrammatic form a longitudinal section through a particularly preferred fluidized bed reactor having two chambers and a discharge device according to the invention arranged between these chambers.

FIG. 1 shows diagramatically a section through a tray-shaped, two-stage fluidized bed apparatus having a siphon weir between the first and second fluidized bed chambers. In the diagram, the reference numerals 1 to 7 have the same meaning as described previously with regard to FIG. 2. The chambers $K_1$ and $K_2$ have spray nozzles 8.1 and 8.2 for spraying a solution $F_1$ or two different solutions $F_1$ and $F_2$, which are conveyed via the lines 9.1 and 9.2 and whose metering is regulated by a pump 10.1 or the pumps 10.1 and 10.2. A hot gas HG is fed to both chambers to generate the fluidized beds; the fluidized bed gas is conveyed by means of a blower 13 and heated by means of a heat exchanger 12. The operating conditions in both chambers can be adapted to different spraying rates by mixing hot gas with other gas (not shown; line 11.3). The gas leaving the chambers passes through the lines 15.1, 15.2 and 15 to a dust separator 16, where dust is removed, and is discharged as waste gas AG. The deposited dust is conveyed via a chamber wheel lock 17 and line 14 to the chamber $K_1$; further nuclei KE from any other suitable source may be charged through the same line 14 into the chamber $K_1$. The granules P are discharged from the chamber $K_2$.

The fluidized bed reactor may be designed round or in the shape of a tray. With the particularly preferred tray-shaped design n+1 stages can be arranged in succession, n being an integer, preferably a number from 1 to 9. The separating wall, provided with a siphon weir, between the stages can separate the latter completely or partially from one another. The separating wall is conveniently sufficiently high so as to prevent any back-mixing.

According to a further embodiment the reactor is characterized in that it is designed as a circular vessel and the siphon-like discharge device is arranged axially, wherein the discharge device comprises a central pipe and an outer pipe arranged concentrically around the latter and closed at the top in the manner of a cap, the lower edge of the outer pipe terminates at the height $h_1$ and the upper edge of the central pipe terminates at the height $h_2$, in each case measured from the fluidizing base plate, and an effective outlet cross-section remains between the upper edge of the central pipe and the cap-like closure. An effective outlet cross-section is ensured if the surface area of the annular gap corresponds to the area of the cross-section of the central pipe and the distance between the upper edge of the central pipe and the cap-like closure corresponds to the width of the annular gap.

The fluidized bed reactor according to the invention is characterized by its simple and reliably effective discharge device. Unforeseeable, disadvantageous feedbacks to a following, in particular to a directly spatially connected continuous process stage, are avoided. The connected process stage may be any arbitrary stage, in particular one that is itself carried out in a fluidized bed. Such a stage may for example be a further granulation, a coating by spraying the granules with a solution, suspension or melt of the layer-forming substance, or a thermal post-treatment. The fluidized bed reactor according to the invention may accordingly be employed with one or more chambers or may comprise a combination of reactors whose first part is the fluidized bed reactor, for the production, coating and conversion of granules. A preferred use of a fluidized bed reactor according to the invention having two or more chambers and a siphon weir between the chambers is suitable for producing coated granules with one or more coating layers. By using a reactor combination according to the invention, in particular a double-chamber or multi-chamber fluidized bed reactor, the process can be operated in a trouble-free manner using the minimum of apparatus and can easily be optimized as regards energy consumption.

We claim:

1. A fluidized bed reactor for the continuous production of granules, comprising a fluidized bed chamber having a floor that is a fluidizing base plate, at least one device for introducing and removing a fluidizing gas, at least one device for introducing granule starting products in liquid form or dissolved and/or suspended in a liquid, and at least one discharge device for discharging the granules into a second chamber, wherein the discharge device comprises a shaft wall, a chamber wall and two side walls, the shaft wall having a lower edge at a height $h_1$ above the fluidizing base plate, the lower edge of the shaft wall and the fluidizing base plate defining an inlet opening for granules, the chamber wall having an upper edge at a height $h_2$ above the fluidizing base plate, $h_2$ being greater than $h_1$, the discharge device further comprising upper and lower guard roofs, the upper guard roof being connected to the shaft wall above the upper edge of the chamber wall and projecting into the second chamber, the lower guard roof being connected to the upper edge of the chamber wall and projecting into the second chamber, the upper and lower guard roofs defining an outlet opening for granules, wherein the shaft wall, the chamber wall, the two side walls and the upper and lower guard roofs form a closed shaft except for the inlet and outlet openings, the shaft having a closed top for conveying granules from the fluidized bed chamber into the second chamber.

2. The fluidized bed reactor according to claim 1, wherein the discharge device extends over the whole width of the fluidizing base plate.

3. A fluidized bed reactor assembly comprising a first fluidizing bed reactor according to claim 1 and a second fluidized bed reactor wherein the first fluidized bed reactor communicates via the discharge device with the second fluidized bed reactor so that granules discharged from the first fluidized bed reactor are fed to the second fluidized bed reactor.

4. The fluidized bed reactor according to claim 1, having between 2 to 9 chambers, a plurality of said chambers being connected by a plurality of said discharge devices for conveying the granules successively from one chamber to the next chamber.

5. A fluidized bed reactor for the continuous production of granules, comprising a circular vessel including a fluidized bed chamber having a floor that is a fluidizing base plate, at least one device for introducing and removing a fluidizing gas, at least one device for introducing granule starting products in liquid form or dissolved and/or suspended in a liquid, and at least one discharge device for discharging the granules, wherein said discharge device is a siphon pipe arranged axially in said circular vessel, comprising a central pipe and an outer pipe arranged concentrically around said central pipe, said outer pipe being closed at the top, said outer pipe having a lower edge terminating at the height $h_1$ above the fluidizing base plate, and said central pipe having an upper edge terminating at the height $h_2$ above the fluidizing base plate, $h_2$ being greater than $h_1$, said lower edge of said outer pipe and said central pipe forming an inlet opening for granules, such that the granules are conveyed from the fluidized bed chamber upwardly through said inlet opening into said outer pipe and downwardly through said central pipe out of said fluidized bed chamber.

\* \* \* \* \*